US009024813B2

(12) United States Patent
Miyagawa et al.

(10) Patent No.: US 9,024,813 B2
(45) Date of Patent: May 5, 2015

(54) METHOD FOR ARRANGING ANTENNA DEVICE, RADAR APPARATUS, AND DIELECTRIC MEMBER

(75) Inventors: Tetsuya Miyagawa, Nishinomiya (JP); Koji Yano, Kobe (JP)

(73) Assignee: Furuno Electric Co., Ltd., Nishinomiya (JP)

(*) Notice: Subject to any disclaimer, the term of this patent is extended or adjusted under 35 U.S.C. 154(b) by 365 days.

(21) Appl. No.: 13/541,627

(22) Filed: Jul. 3, 2012

(65) Prior Publication Data

US 2013/0009805 A1 Jan. 10, 2013

(30) Foreign Application Priority Data

Jul. 6, 2011 (JP) ................................ 2011-150478

(51) Int. Cl.

| | |
|---|---|
| ***G01S 13/00*** | (2006.01) |
| ***H01Q 3/00*** | (2006.01) |
| ***H01Q 13/10*** | (2006.01) |
| ***H01Q 13/00*** | (2006.01) |
| ***H01Q 13/02*** | (2006.01) |
| ***H01Q 13/28*** | (2006.01) |
| ***H01Q 21/00*** | (2006.01) |
| *H01Q 13/24* | (2006.01) |

(52) U.S. Cl.

CPC ....... *H01Q 13/0233* (2013.01); *Y10T 29/49016* (2015.01); *H01Q 13/24* (2013.01); *H01Q 13/28* (2013.01); *H01Q 21/0043* (2013.01)

(58) Field of Classification Search

CPC ..... H01Q 1/422; H01Q 9/0485; H01Q 13/24; H01Q 13/28; H01Q 15/08; H01Q 19/09; H01Q 21/0068

USPC .......... 342/1-4, 118, 124, 175, 179; 343/746, 343/753, 762, 767-786

See application file for complete search history.

(56) References Cited

U.S. PATENT DOCUMENTS

| | | | | |
|---|---|---|---|---|
| 3,935,577 | A * | 1/1976 | Hansen | 343/781 R |
| 4,246,584 | A * | 1/1981 | Noerpel | 343/786 |
| 4,783,665 | A * | 11/1988 | Lier et al. | 343/786 |
| 5,117,240 | A * | 5/1992 | Anderson et al. | 343/786 |
| 5,486,832 | A * | 1/1996 | Hulderman | 342/70 |
| 6,020,859 | A * | 2/2000 | Kildal | 343/781 CA |
| 6,675,011 | B1 * | 1/2004 | Kita | 455/422.1 |
| 6,806,824 | B2 * | 10/2004 | Kornle et al. | 342/118 |
| 6,831,612 | B2 * | 12/2004 | King et al. | 343/772 |

(Continued)

FOREIGN PATENT DOCUMENTS

| | | |
|---|---|---|
| JP | 2008028795 A | 2/2008 |
| JP | 2010157865 A | 7/2010 |

OTHER PUBLICATIONS

ISA European Patent Office, Extended European Search Report of EP12174630, Nov. 20, 2012, Germany, 5 pages.

*Primary Examiner* — Peter Bythrow

(74) *Attorney, Agent, or Firm* — Alleman Hall McCoy Russell & Tuttle LLP

(57) ABSTRACT

An antenna device is provided. The antenna device includes a radiator for radiating an electromagnetic wave, and a dielectric body arranged on an electromagnetic wave radiating side of the radiator, and having a plurality of dielectric members arrayed in a longitudinal direction of the radiator, wherein boundaries between the plurality of adjacent dielectric members are asymmetric with respect to a virtual line perpendicularly passing through the center of the dielectric body in the longitudinal direction.

10 Claims, 6 Drawing Sheets

(56) References Cited

U.S. PATENT DOCUMENTS

| | | | | |
|---|---|---|---|---|
| 6,879,298 | B1 * | 4/2005 | Zarro et al. | 343/786 |
| 6,891,513 | B2 * | 5/2005 | Kienzle et al. | 343/786 |
| RE39,053 | E * | 4/2006 | Rees | 342/29 |
| 7,075,496 | B2 * | 7/2006 | Hidai et al. | 343/786 |
| 7,379,030 | B1 * | 5/2008 | Lier | 343/786 |
| 7,623,085 | B1 * | 11/2009 | Lier | 343/786 |
| 8,242,965 | B2 * | 8/2012 | Gerding et al. | 343/783 |
| 8,599,091 | B2 * | 12/2013 | Yano | 343/772 |
| 2001/0017603 | A1 * | 8/2001 | Teshirogi et al. | 343/845 |
| 2003/0095074 | A1 * | 5/2003 | Scorer et al. | 343/772 |
| 2003/0179148 | A1 * | 9/2003 | Ohlsson | 343/786 |
| 2005/0062664 | A1 * | 3/2005 | Hidai et al. | 343/786 |
| 2005/0083241 | A1 * | 4/2005 | Zarro et al. | 343/786 |
| 2010/0026597 | A1 * | 2/2010 | Yano | 343/772 |
| 2010/0164827 | A1 * | 7/2010 | Miyagawa et al. | 343/843 |
| 2010/0220024 | A1 * | 9/2010 | Snow et al. | 343/772 |
| 2011/0109497 | A1 * | 5/2011 | Yano | 342/146 |

* cited by examiner

METHOD FOR ARRANGING ANTENNA DEVICE, RADAR APPARATUS, AND DIELECTRIC MEMBER

CROSS-REFERENCE TO RELATED APPLICATION(S)

The application claims priority under 35 U.S.C. §119 to Japanese Patent Application No. 2011-150478, which was filed on Jul. 6, 2011, the entire disclosure of which is hereby incorporated by reference.

TECHNICAL FIELD

The present invention relates to an antenna device including a plurality of dielectric bodies.

BACKGROUND OF THE INVENTION

Conventionally, antenna devices are known that include a radiation unit (an antenna element) for radiating an electromagnetic wave, and a dielectric body for beam-forming the electromagnetic wave radiated from the radiation unit. JP2008-028795A and JP2010-157865A disclose such antenna devices.

The conventional radiation unit includes, for example, a waveguide formed with slits, and the electromagnetic wave is radiated from the slits. A plurality of dielectric bodies are arranged on an electromagnetic wave radiating side of the radiation unit. The electromagnetic wave radiated from the radiation unit is beam-formed according to, for example, a shape or an arrangement of the dielectric bodies.

For example, by arranging two of the dielectric bodies to face each other at a predetermined distance so that the electromagnetic wave passes therebetween, a beam width of the electromagnetic wave can be suppressed.

Incidentally, an antenna having a long length of, for example, several meters, may be used as a slot array antenna for a ship. When applying the dielectric body to this kind of antenna, a long dielectric body is required. However, because a long dielectric body is higher in cost per length unit compared to a shorter dielectric body, material costs increase. Moreover, a long dielectric body is difficult to handle since, for example, transportation costs increase, and time and labor required for assembly increase.

In order to solve this problem, instead of utilizing the long dielectric body, a configuration of arranging a plurality of the shorter dielectric bodies in a row can be considered. However, in this configuration, a boundary (divided face) between the adjacent dielectric bodies becomes a wave source, and causes side lobes. As a result, for example, a false image is displayed on a radar image, and a proper transception of the electromagnetic wave cannot be performed.

The present invention is made in view of the above situation, and provides an antenna device including a plurality of dielectric bodies, configured to suppress an effect of the boundary between the adjacent dielectric bodies becoming a wave source and causing side lobes.

SUMMARY OF THE INVENTION

According to one aspect of the invention, an antenna device is provided. The device includes a radiator for radiating an electromagnetic wave, and a dielectric body arranged on an electromagnetic wave radiating side of the radiator and having a plurality of dielectric members arrayed in a longitudinal direction of the radiator, wherein boundaries between the plurality of adjacent dielectric members are asymmetric with respect to a virtual line perpendicularly passing through the center of the dielectric body in the longitudinal direction.

In this manner, influence from side lobes emanating from a wave source at the boundary between the adjacent dielectric members can be reduced. Therefore, the electromagnetic wave can accurately be radiated in a desired direction. Further, conventionally, there has been no choice but to use a long dielectric body to suppress the side lobes; however, by adopting the configuration of this aspect, a plurality of shorter dielectric bodies (dielectric members) can be used. Thus, reduction in material cost and easier assembly can be achieved.

The dielectric member arranged at at least one end of the dielectric body may have a different length from the other dielectric members.

In this manner, the configuration of the dielectric body becomes asymmetric, and the influence from the side lobes emanating from the wave source at the boundary between the adjacent dielectric members can be reduced.

The dielectric members arranged at locations other than an end of the dielectric body may have the same length.

In this manner, the configuration of the dielectric body can be asymmetric while including the dielectric members having the same length. Thus, material cost and parts management cost can be reduced.

All the dielectric members arranged at locations other than the ends of the dielectric body may have the same length, and a sum length of the dielectric members arranged at the ends may be the same length as each of the other dielectric members.

This configuration is achieved by preparing a plurality of dielectric members having the same length, dividing one of the members into two, and arranging them at the ends.

A length of the dielectric member arranged at one of the ends may be one-third of the length of each dielectric member arranged at locations other than the ends, and a length of the dielectric member arranged at the other end may be two-thirds of the length of each dielectric member arranged at locations other than the ends.

In this manner, the influence from the side lobes emanating from the wave source at the boundary between the adjacent dielectric members can be reduced effectively.

The radiator may include a waveguide formed with a plurality of slots, the waveguide radiating electromagnetic wave from the slots.

In this manner, the effects described above can be achieved by a slot array antenna. Further, because slot array antennas generally tend to have a long antenna length, the effects of the configurations of this aspect, in which the plurality of shorter dielectric members can be used, can even more effectively be achieved.

The antenna device may serve as a radar antenna for transmitting the electromagnetic wave and receiving a reflection wave thereof.

In this manner, the effects described above can be exerted in the radar antenna.

According to another aspect of the invention, a radar apparatus is provided. The radar apparatus includes the antenna device of any of the other aspects, and a radar image creator for creating a radar image based on the reflection wave.

In this manner, the effects described above can be exerted in the radar apparatus.

According to yet another aspect of the invention, a method of arranging a plurality of dielectric members of an antenna device is provided. The antenna includes a radiator for radiating an electromagnetic wave, and a dielectric body arranged on an electromagnetic wave radiating side of the radiator, and having the plurality of dielectric members arrayed in a longitudinal direction of the radiator. The method includes arranging the dielectric members so that boundaries between the plurality of adjacent dielectric members are asymmetric with respect to a virtual line perpendicularly passing through the center of the dielectric body in the longitudinal direction.

In this manner, the influence from the side lobes emanating from the wave source at the boundary between the adjacent dielectric members can be reduced. Thus, the plurality of shorter dielectric bodies (dielectric members) can be used, and therefore, the reduction in material cost and easier assembly can be achieved.

The method of arranging a plurality of dielectric members of an antenna device also includes using two or more of the dielectric members having the same length, dividing one of the two or more of the dielectric members into two parts, and arranging the plurality of dielectric members so that the divided dielectric member parts are arranged at ends of the dielectric body, respectively, and the rest of the dielectric members having the same length are arranged at locations other than the ends.

In this manner, the influence from the side lobes emanating from the wave source at the boundary between the adjacent dielectric members can be reduced while also reducing the parts management by using the dielectric members having the same length.

BRIEF DESCRIPTION OF THE DRAWINGS

The present disclosure is illustrated by way of example and not by way of limitation in the figures of the accompanying drawings, in which like reference numerals indicate like elements and in which.

DETAILED DESCRIPTION

Figure 1:
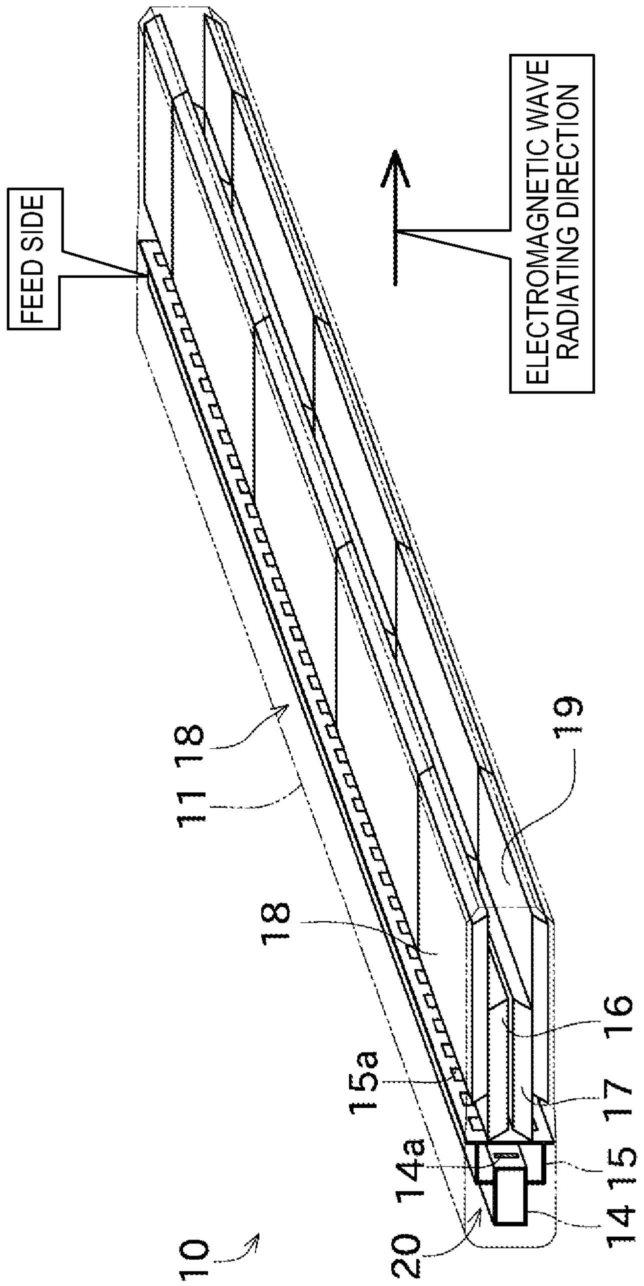
FIG. 1 is a perspective view of an antenna device according to an embodiment of the present invention.
Figure 2:
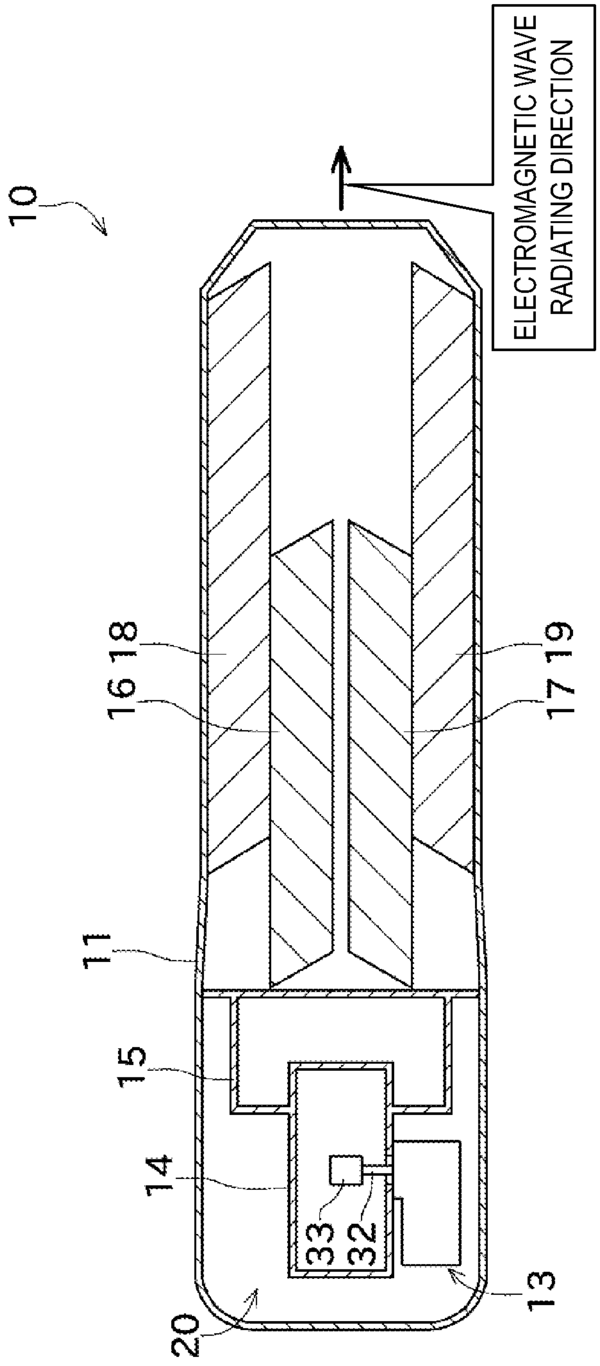
FIG. 2 is a side cross-sectional view of the antenna device showing a feed side thereof.

Next, an embodiment of the present invention is described with reference to the appended drawings. First, an overall configuration of an antenna device 10 of this embodiment is described with reference to FIGS. 1 and 2. FIG. 1 is a perspective view of the antenna device according to this embodiment of the present invention. FIG. 2 is a side cross-sectional view of the antenna device 10 showing a feed side thereof.

The antenna device 10 is a waveguide type slot array antenna that can radiate an electromagnetic wave to a direction indicated by arrows shown in FIGS. 1 and 2. The antenna device 10 is, for example, mounted on a ship as a radar antenna for transmitting the electromagnetic wave and receiving a reflection wave of the electromagnetic wave. The antenna device 10 is used with, for example, a radar image creator for creating a radar image, and a display unit for displaying the radar image.

The radar image creator acquires a distance to a target object based on a time difference between a timing at which the antenna device 10 transmits the electromagnetic wave and a timing at which the antenna device 10 receives the reflection wave. Note that, in a case where the antenna device 10 radiates the electromagnetic wave while it revolves, the radar image creator acquires a direction to the target object by a facing direction of the antenna device 10. Thus, the radar image creator creates the radar image.

The antenna device 10 includes an antenna case 11, a radiation unit 20, and dielectric bodies 16, 17, 18 and 19. The radiation unit 20 includes a coaxial waveguide transducer 13 (only illustrated in FIG. 2), a radiation waveguide 14 (a waveguide), and a vertical polarization suppressor 15.

The antenna case 11 covers the components configuring the antenna device 10. The antenna case 11 is made from fiber reinforced plastic (FRP) in consideration of its resistance to environmental wear and its lack of negative effect on the radiation intensity of the antenna. Note that, to provide a simplified view of an inside of the antenna device 10, only an outline of the antenna case 11 is shown in, for example, FIG. 1.

The coaxial waveguide transducer 13 is connected with a coaxial cable (not illustrated). The coaxial cable transmits to the antenna device 10 the electromagnetic wave generated by using, for example, a magnetron (not illustrated) arranged outside the antenna device 10. The coaxial waveguide transducer 13 includes, as shown in FIG. 2, a transmitting part 32 and a probe 33.

The transmitting part 32 transmits the electromagnetic wave flown from the coaxial cable to the probe 33. The probe 33 converts the electromagnetic wave transmitted by the transmitting part 32, from a coaxial mode to a waveguide mode. Note that, in this embodiment, the radiation unit 20 is an end-feed type, and is arranged with the probe 33 in only one end thereof (the feed side shown in FIGS. 1 and 3). The electromagnetic wave of which the mode is converted by the probe 33 is transmitted to the radiation waveguide 14.

The radiation waveguide 14 is a tubular metallic member. A plurality of slots 14*a* shown in FIG. 1 are formed in a radiation waveguide 14 along a longitudinal direction of the radiation unit 20. The radiation waveguide 14 radiates the electromagnetic wave transmitted by the coaxial waveguide transducer 13 (probe 33) from the slots 14*a* toward an electromagnetic wave radiating direction.

The vertical polarization suppressor 15 is a tubular metallic member. A plurality of grids 15*a* shown in FIG. 1 are formed in the vertical polarization suppressor 15 along a longitudinal direction of the radiation unit 20. The vertical polarization suppressor 15 radiates the electromagnetic wave transmitted by the radiation waveguide 14, from the grids 15*a* externally. As above, the electromagnetic wave passes through the slots 14*a* and the grids 15*a*, and thus, a vertical polarization element can be suppressed.

The dielectric bodies 16, 17, 18 and 19 that use a foamed dielectric body as a material are arranged on an electromagnetic wave radiating side of the vertical polarization suppressor 15. Specifically, the dielectric bodies 18 and 19 are arranged outward of the dielectric bodies 16 and 17, respectively, the dielectric bodies 16 and 17 being arranged in parallel to each other with a predetermined space therebetween. The electromagnetic wave radiated by the antenna device 10 is suppressed at a directivity angle (beam width in the vertical direction) according to the spaces between the dielectric bodies 16, 17, 18 and 19. Note that, the directivity angle can be adjusted by not only changing the spaces between the dielectric bodies 16, 17, 18 and 19, but also by changing the dielectric constant.

With the above configuration, the antenna device 10 can release the electromagnetic wave generated by using, for example, the magnetron, externally at a predetermined directivity angle.

Figure 3:
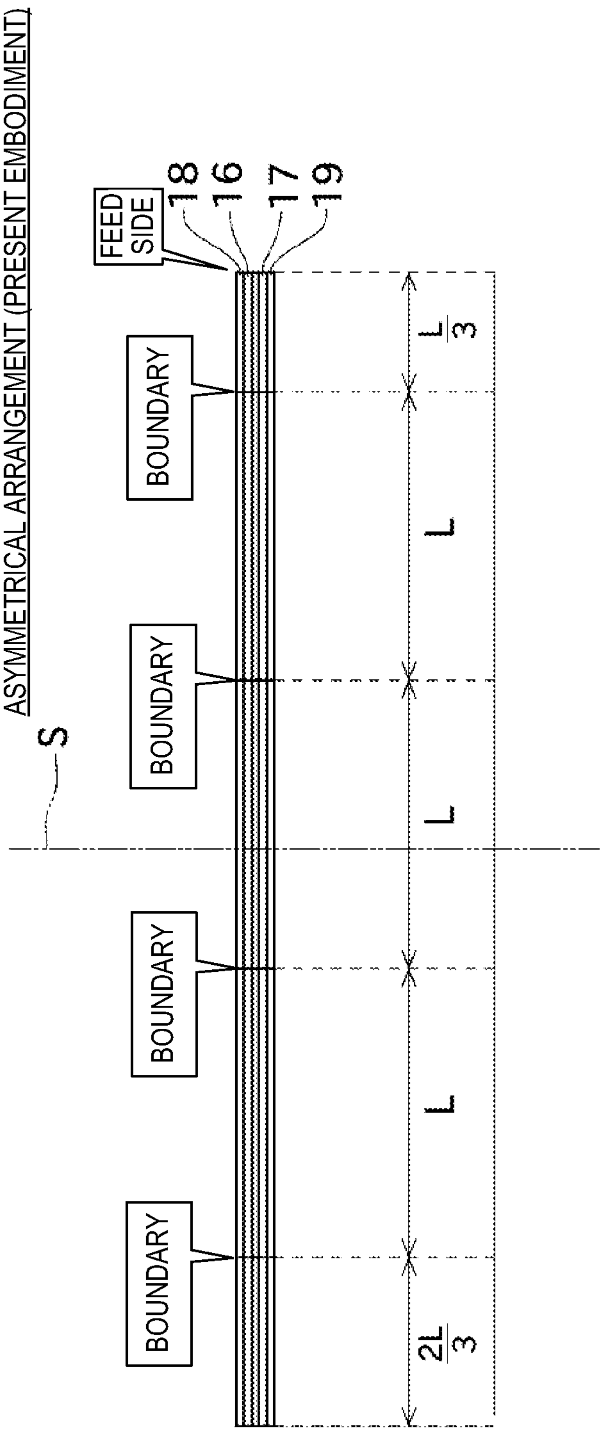
FIG. 3 is a front view of the antenna device showing that boundaries between adjacent dielectric members are asymmetric.
Figure 4A:
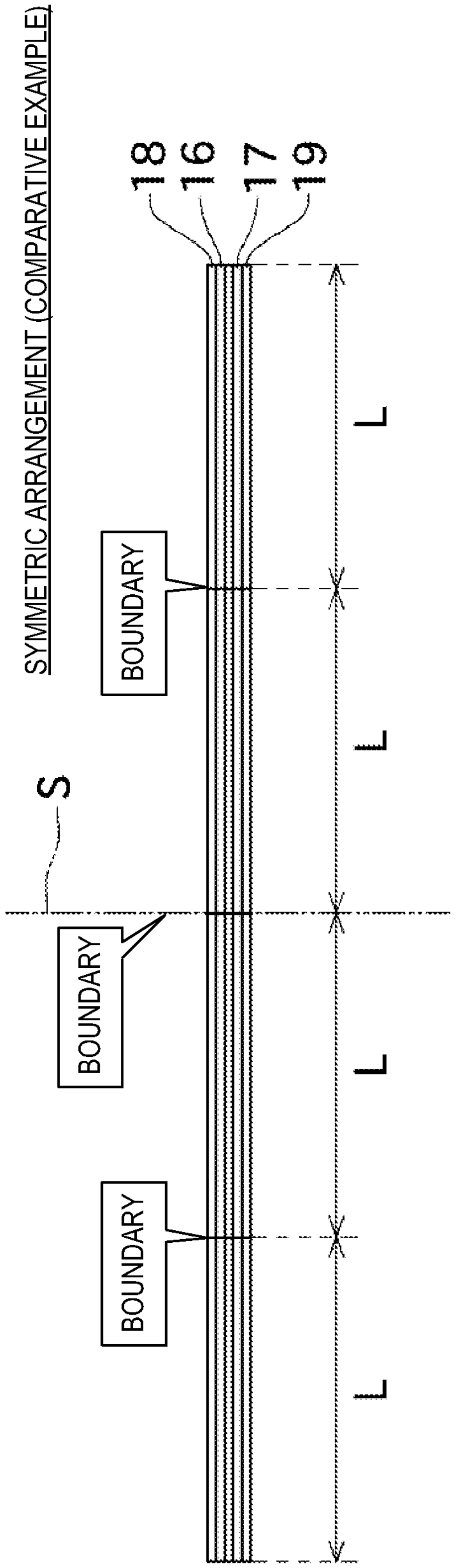
FIGS. 4A and 4B are front views of the antenna device of a comparative example showing that the boundaries are symmetric.
Figure 4B:
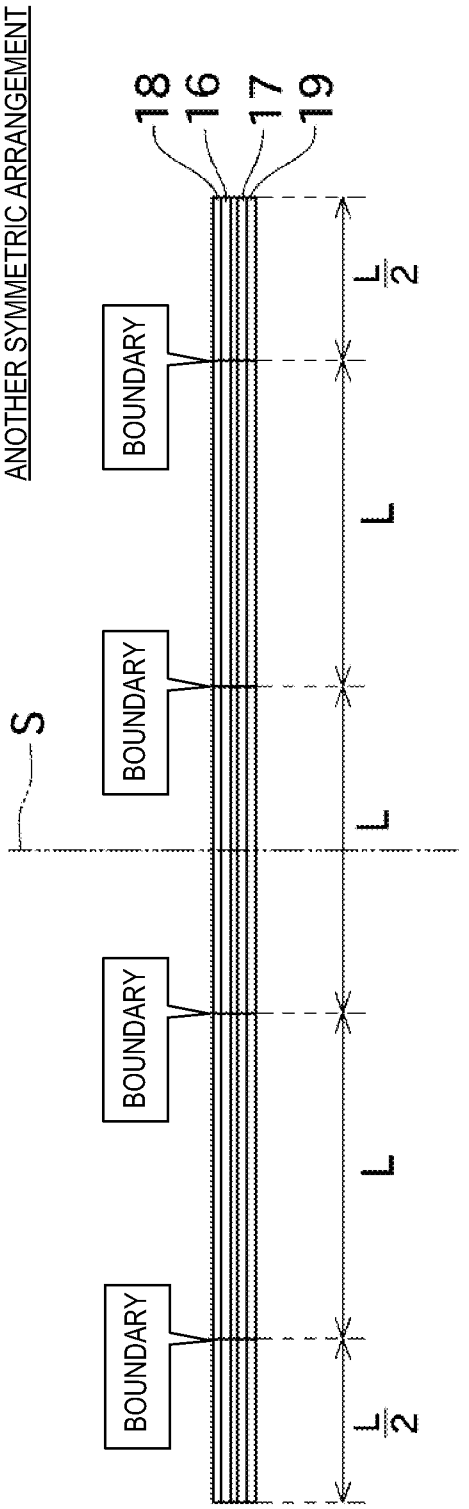

Next, a detailed configuration of each of the dielectric bodies 16, 17, 18 and 19 is described with reference to FIGS. 3, 4A, and 4B. FIG. 3 is a front view of the antenna device 10 showing that the boundaries are asymmetric. FIGS. 4A and 4B are front views of the antenna device 10 in a comparative example showing that the boundaries are symmetric. Note that, the front view can also be expressed as "a view seen from a direction opposite to the electromagnetic wave radiating direction."

Hereinafter, because the dielectric bodies 16, 17, 18 and 19 have substantially the same configuration, the dielectric body 16 is used for description representatively. Note that, in the description of the dielectric bodies, a longitudinal length thereof may simply be referred to as "the length."

As shown in, for example, FIG. 3, the dielectric body 16 is formed with five dielectric members. Among the five dielectric members, two of the dielectric members arranged at ends of the dielectric body 16, respectively, are different in length from the other three dielectric members. In detail, if the length of each dielectric member arranged at other than the ends is L, the length of the dielectric member at the end on the feed side is L/3. On the other hand, the length of the dielectric member at the end on the other side is 2L/3.

Next, a method of forming the dielectric body 16 is described. The dielectric body 16 is formed with four dielectric members having the same length (L). First, an operator divides one of the four dielectric members into two so that one of them has the length of L/3 and the other side has the length of 2L/3. The dielectric member with the length of L/3 is arranged to serve as an end part of the dielectric body 16 on the feed side, the dielectric member with the length of 2L/3 is arranged to serve as another end part, and the three dielectric members with the length of L are arranged therebetween.

The dielectric body 16 of this embodiment is formed as described above. A similar method is used for forming the dielectric bodies 17, 18 and 19. In this manner, the assembly of forming the dielectric bodies is completed.

Note that, because the dielectric bodies 16, 17, 18 and 19 are formed in the above method, the sum of the lengths of the dielectric members arranged at the ends (L/3+2L/3=L) is equal to the length (L) of the dielectric members arranged at locations other than the ends.

With the above formation process, the dielectric body 16 can be formed from an inventory of component dielectric members that have the same length. In this manner, inventory management of the dielectric members can be simplified. Specifically, the dielectric members do not have to be sorted by length for storage, and, for example, quantity management and ordering thereof can be simplified.

Further, by forming the dielectric body 16 as described above, in the front view, boundaries (dividing positions) between the adjacent dielectric members become asymmetric when basing a virtual line S (a virtual line serving as a perpendicular bisector of the dielectric body 16) passing perpendicularly at the center of the dielectric body 16 in the longitudinal direction thereof.

Whereas, the dielectric body 16 formed only with the dielectric members having the same length becomes symmetric at the boundaries of the dielectric members, with respect to a virtual line S drawn similarly, as shown in FIG. 4A. Note that, hereinafter, the antenna device configured with the dielectric members with the configuration shown in FIG. 4A may be referred to as the "comparative example."

Note that, even when the dielectric body is formed in a similar method to this embodiment, if the lengths of the dielectric members at the ends are equal, as shown in FIG. 4B, the boundaries of the dielectric members become symmetric.

Figure 5:
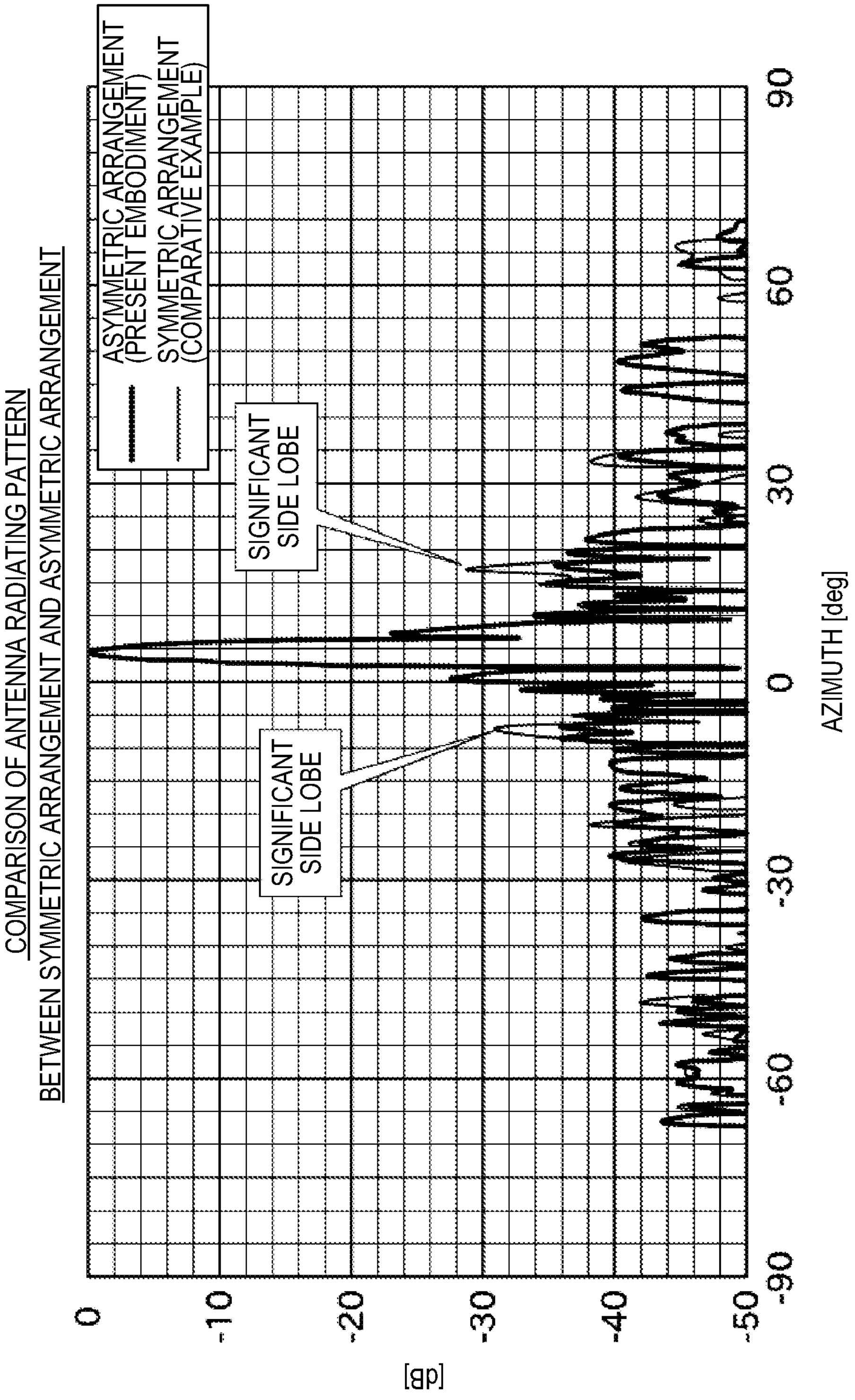
FIG. 5 is a chart for comparing antenna radiating patterns in cases where the boundaries are symmetric and asymmetric.
Figure 6:
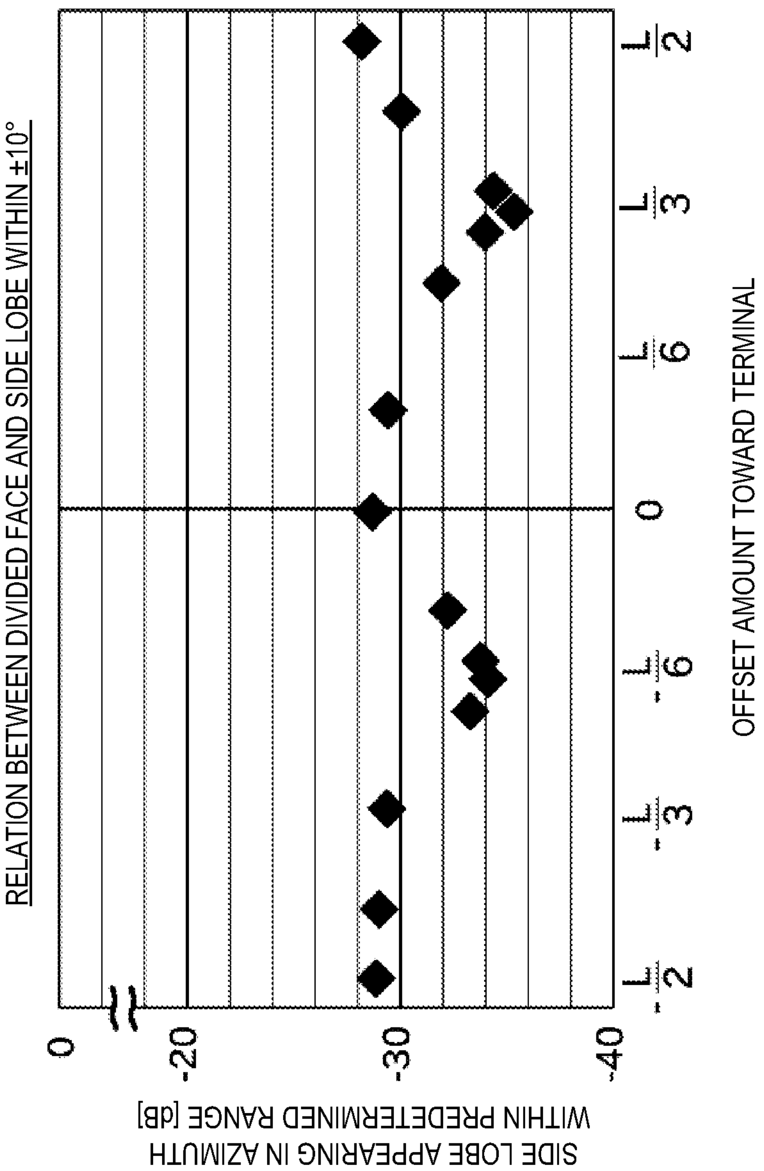
FIG. 6 is a chart showing a relation between boundaries and side lobes.

Next, an experiment executed by the present inventors to verify that an effect of side lobes is reduced by asymmetrising the boundaries of the dielectric members is described. FIG. 5 is a chart for comparing antenna radiating patterns in cases where the boundaries are symmetric and asymmetric. FIG. 6 is a chart showing a relation between the boundaries and the side lobes.

In FIG. 5, the antenna radiating pattern of this embodiment (the boundaries of the dielectric members are asymmetric) is indicated by a bold line, and the antenna radiating pattern of the comparative example (the boundaries of the dielectric members are symmetric) is indicated by a thin line. As shown in FIG. 5, in the antenna radiating pattern of the comparative example, an appearance of the side lobes is significantly near a main beam. These side lobes can be thought to have a wave source at the boundary of the dielectric members. On the other hand, in the antenna radiating pattern of this embodiment, such side lobes did not appear. In other words, by asymmetrising the boundaries of the dielectric members as in this embodiment, it can be said that the effect of the side lobes is decreased.

FIG. 6 is a chart showing relations of target positions of the dielectric member with an electromagnetic wave generated from the azimuth within a predetermined range (side lobes). Note that, in the dielectric body, as described above, the central three dielectric members out of the five dielectric members have the same length, and the sum of the lengths of the dielectric members at the ends is equal to the length of each of the central dielectric members. Further, an "offset amount toward terminal" in the horizontal axis of FIG. 6 shows an amount by which the boundaries are moved with respect to the comparative example (the boundaries are symmetric) shown in FIG. 4A, toward the terminal (the end side opposite to the feed side). That is, in this embodiment, as shown in FIG. 3, because the boundary is moved by only L/3 from the comparative example shown in FIG. 4A toward the terminal, the "offset amount toward terminal" becomes L/3.

As shown in FIG. 6, the effect of the side lobes becomes larger in a case where the "offset amount toward terminal" becomes 0 (the comparative example shown in FIG. 4A) and a case where the "offset amount toward terminal" becomes approximately ±L/2 (the comparative example shown in FIG. 4B). That is, the side lobes are estimated to appear significantly when the boundaries of the dielectric members become symmetric.

On the other hand, the side lobes are decreased greatly when, the "offset amount toward terminal" becomes approximately L/3 (this embodiment) and when the "offset amount toward terminal" becomes approximately −L/6 (i.e., approximately −5L/6). Due to 5L/6−L/3=L/2, a difference in offset amount between the two configurations in which the side lobes are greatly decreased is estimated to be approximately L/2.

As described above, the antenna device 10 includes the radiation unit 20, and the dielectric bodies 16, 17, 18 and 19. The radiation unit 20 radiates the electromagnetic wave. The dielectric bodies 16, 17, 18 and 19 are arranged on the electromagnetic wave radiating side of the radiation unit 20, and each of them are formed with the plurality of dielectric members arrayed in the longitudinal direction of the radiation unit 20. With respect to the virtual line S perpendicularly passing through the centers of the dielectric bodies 16, 17, 18 and 19 in the longitudinal direction, respectively, and serving as the symmetrical axis, the boundaries of the plurality of dielectric members arrayed in the longitudinal direction of the radiation unit 20 are asymmetric.

In this manner, the effect from the side lobes emanating from the wave source at the boundary between the dielectric members can be reduced. Therefore, the electromagnetic wave can be radiated accurately in a desired direction. Further, the adoption of the configuration of this embodiment allows a plurality of short dielectric bodies (dielectric members) to be used. Thus, reductions in material cost and parts management cost, and easier assembly can be achieved.

In the foregoing, an illustrative embodiment of the present invention has been described. It will be understood that the above configuration is merely exemplary, and may be suitably modified in various ways, such as described below.

The number and lengths of the dielectric members constituting the dielectric body are not limited to the above example, and are arbitrary as long as the boundaries of the dielectric members are asymmetric with respect to the virtual line S.

The radiation unit 20 is not limited to the end feed type and may be a center feed type in which the probe 30 is arranged around the center of the radiation unit 20 in the longitudinal direction.

The shape of the probe 33 is not limited to the above example, and may be an arbitrary shape. For example, the shape may be determined according to a thickness and width of the plate and the shape of the waveguide so that the electromagnetic wave is transmitted appropriately.

The antenna device 10 is not limited to the slot array antenna and may be arbitrary as long as the dielectric bodies are aligned horizontally.

The antenna device 10 is not limited to the ship radar antenna described above, and may be a radar antenna mounted on another movable body, or a radar antenna for a radar apparatus installed in, for example, a lighthouse and for observing a position of a movable body. Moreover, other than such radar antennas, the present invention may be applied to an antenna used only for transmitting predetermined information.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An antenna device, comprising:

a radiator for radiating an electromagnetic wave, the radiator configured with a length of the radiator in a longitudinal direction greater than a width of the radiator; and a dielectric body arranged on an electromagnetic wave radiating side of the radiator, and having three or more dielectric members arrayed along a length of a longitudinal axis of the dielectric body, the longitudinal axis of the dielectric body being parallel to the longitudinal direction of the radiator, wherein boundaries between adjacent dielectric members of the three or more dielectric members are asymmetrically located lengthwise along the longitudinal axis of the dielectric body with respect to a virtual line perpendicularly passing through a center of the longitudinal axis of the dielectric body.

2. The antenna device of claim 1, wherein a dielectric member arranged at an at least one end of the dielectric body has a different longitudinal length from other dielectric members.

3. The antenna device of claim 1, wherein at least two of the dielectric members arranged at locations other than an end of the dielectric body have a same longitudinal length.

4. The antenna device of claim 3, wherein all the dielectric members arranged at the locations other than the ends of the dielectric body have the same longitudinal length, and a sum of the longitudinal lengths of the dielectric members arranged at the ends has the same longitudinal length as each of the other dielectric members.

5. The antenna device of claim 4, wherein a longitudinal length of the dielectric member arranged at one of the ends is one-third of the longitudinal length of each dielectric member arranged at the locations other than the ends, and a longitudinal length of the dielectric member arranged at the other end is two-thirds of the longitudinal length of each dielectric member arranged at the locations other than the ends.

6. The antenna device of claim 1, wherein the radiator includes a waveguide formed with a plurality of slots, the waveguide radiating the electromagnetic wave from the slots.

7. The antenna device of claim 1, wherein the antenna device serves as a radar antenna for transmitting the electromagnetic wave and receiving a reflection wave thereof.

8. A radar apparatus comprising:

an antenna device including a radiator for radiating an electromagnetic wave, the radiator configured with a length of the radiator in a longitudinal direction greater than a width of the radiator, and a dielectric body arranged on an electromagnetic wave radiating side of the radiator and having three or more dielectric members arrayed along a length of a longitudinal axis of the dielectric body, the longitudinal axis of the dielectric body being parallel to the longitudinal direction of the radiator, wherein boundaries between adjacent dielectric members of the three or more dielectric members are asymmetrically located lengthwise along the longitudinal axis of the dielectric body with respect to a virtual line perpendicularly passing through a center of the longitudinal axis of the dielectric body, and wherein the antenna device serves as a radar antenna for transmitting the electromagnetic wave and receiving a reflection wave thereof; and a radar image creator for creating a radar image based on the reflection wave.

9. A method of arranging a plurality of dielectric members of an antenna device, the antenna including a radiator for radiating an electromagnetic wave, the radiator configured with a length of the radiator in a longitudinal direction greater than a width of the radiator, and a dielectric body arranged on an electromagnetic wave radiating side of the radiator, and having three or more dielectric members arrayed along a length of a longitudinal axis of the dielectric body, the longitudinal axis of the dielectric body being parallel to the longitudinal direction of the radiator, the method comprising arranging the dielectric members so that boundaries between adjacent dielectric members of the three or more dielectric members are asymmetrically located lengthwise along the longitudinal axis of the dielectric body with respect to a virtual line perpendicularly passing through a center of the longitudinal axis of the dielectric body.

10. The method of claim 9, further comprising:

using two or more of the dielectric members having a same longitudinal length;

dividing one of the two or more of the dielectric members into two parts such that a sum of a longitudinal length of the two parts is the same longitudinal length as each of the other dielectric members; and arranging the three or more dielectric members so that the divided dielectric member parts are arranged at ends of the dielectric body, respectively, and the rest of the dielectric members having the same longitudinal length are arranged at locations other than the ends.

* * * * *